United States Patent Office 2,958,627
Patented Nov. 1, 1960

2,958,627

ORGANIC HYDROCHLORIDE AND KARAYA GUM COMPOSITION AND METHOD FOR MAKING SAME

Walter Stein, Scarsdale, N.Y., assignor to Norgine Laboratories Inc., New York, N.Y., a corporation of New York No Drawing. Filed Jan. 29, 1958, Ser. No. 711,790

14 Claims. (Cl. 167—55)

This invention relates to a novel composition which is especially useful for combatting achlorhydria or hypochlorhydria.

Human beings having a deficiency of hydrochloric acid in the stomach must supplement their natural supply by ingesting materials which will release the required acid for digestion. Should the materials release acid at a slower rate than is required for digestion, the condition is only partially remedied, whereas materials which release the acid at a faster rate than is usual may cause damage to the mucous membranes, not to mention the unpleasant oral experience which is obtained from the release of acid in the mouth. It is important to find a material which can release hydrochloric acid at a rate which will not cause damage or discomfort to the user. The present invention is concerned with such a material.

An object of this invention is to provide a composition by which achlorhydria or hypochlorhydria can be combatted.

Another object of this invention is to provide a method of combatting achlorhydria or hypochlorhydria by the use of a material which releases the acid at an optimum rate from the standpoint of avoiding damage to the mucous membranes and avoiding unpleasant experiences generally.

Other objects and advantages of this invention will become apparent from the following description and explanation thereof.

The present invention is concerned with an edible organic hydrochloride which is capable of releasing hydrogen chloride in aqueous mediums in combination with karaya gum.

The organic hydrochlorides belong to a class of materials which is known to those skilled in the art and their application as a means of combatting achlorhydria or hypochlorhydria will be readily appreciated. These materials must be edible or non-toxic and when in aqueous mediums release hydrogen chloride. The organic hydrochlorides which are useful for this purpose include, for example, the amino acid hydrochlorides, e.g. glutamic acid hydrochlorides, betaine hydrochloride, etc. or others, such as urea hydrochloride, etc. One undesirable feature of all known useful organic hydro-chlorides is that in the stomach they release hydrogen chloride at a faster rate than is desirable, and consequently the user may suffer damage to his mucous membranes. For safe and comfortable use of the organic hydrochlorides the rate of release of hydrogen chloride must be controlled.

In facing the problem of controlling release of the acid, it would seem desirable to modify the organic hydrochloride molecule so that the acid release would approach closely that required for safe use in the stomach. However, this approach has many difficult aspects which foreclose any serious research undertaking. The way in which this problem was finally solved was to seek a material having absorptive properties so that when in intimate contact with the organic hydrochloride, the released acid is absorbed quickly but desorbed at a slow enough rate to avoid substantial damage to the mucous membranes. There is no known technical means by which it is possible to predict that a particular material will work. The conditions of the stomach, the nature of the organic hydrochloride all serve to present too many variables for such a forecast. It was only through diligent effort that it was found that karaya gum has outstanding properties for the use of this invention. Karaya gum stood out as being uniquely suited because it is inert to the substances in the stomach, offers no untoward effects when ingested, absorbs readily the hydrogen chloride which is released from the organic hydrochloride and very significantly it desorbs the acid at a very satisfactory rate.

In the manufacture of the composition of this invention, the karaya gum is employed in a finely-divided form or as a powder. The average particle size of the gum may vary considerably, the size governing to some extent the absorptive characteristics when the gum is in intimate contact with the organic hydrochloride. An average particle size of about 100 mesh, ASTM, has been found to work satisfactorily, but here again a skilled person would readily appreciate the wide variations that are permissible in regard to particle size. About 1 part by weight of gum is mixed with about 0.1 to 10 parts by weight of the organic hydrochloride. The resultant mixture is wetted with an alcohol such as alkanol. The alcohol can be a low molecular weight type, as for example ethanol, which contains from about 2 to 5 carbon atoms. About 0.2 to 1 part by weight of the alcohol are used to produce a pasty mass. Thereafter the pasty mass is granulated into a particulated form having an average particle size of about 1 to 3 mm. The granules are then dried for 2 to 4 hours at a temperature of about 100–120° F. Granulation and drying may be varied from the manner described, and here again such latitude will be readily appreciated by those skilled in the art. The dried granules may be the unit dosage form, or if desired, the granules may be compressed into other shapes such as tablets, ovules or the like.

In the dosage unit form, hydrochloric acid is released very gradually. The total quantity of acid released per unit time is determined by the relative proportion of gum and organic hydrochloride and the total weight of the dosage unit. The consumer can find with little effort the dosage to be taken.

To provide a better understanding of this invention, reference will be had to the following specific examples.

EXAMPLE I 211 grams of glutamic acid hydrochloride were mixed with 48 grams of karaya gum having an average particle size of about 100 mesh, ASTM. About 40 cc. of 95% by volume ethanol were added and the resultant paste was granulated. The granules were dried at 105° F. for 2 hours. 12 grams of magnesium stearate, which acts as a compression lubricant, were added to the dried granules and the mass was compressed into tablets weighing 0.68 gram. The tablet contained 0.53 gram of organic hydrochloride. The release of hydrogen chloride was measured in the following way:

A tablet was added to 50 cc. of distilled water and the pH of the solution was measured at regular intervals. The results are given in Table I below. The pH of the water was 4.5.

Table I

| Time (min.) | 0 | 0.5 | 1 | 3 | 6 | 10 | 15 | 30 |
|---|---|---|---|---|---|---|---|---|
| pH | 3.2 | 2.7 | 2.5 | 2.3 | 2.1 | 1.9 | 1.9 | 1.9 |

The above data demonstrates the unexpectedly good release of hydrogen chloride in an optimum manner for utilization in the stomach. This is more clearly brought out by comparison with the data in Table II below. The data in Table II is typical of using either .44 grams of betaine hyrdochloride alone or 0.53 grams of glutamic acid hydrochloride alone in 50 cc. of distilled water.

*Table II*

| Time (min.) | 0 | 0.5 | 1 | 3 | 6 |
|---|---|---|---|---|---|
| pH | 1.9 | 1.9 | 1.9 | 1.9 | 1.9 |

Additional experiments were conducted to determine how other hydrochlorides would work and to find how the rate of hydrogen chloride release would vary by changing certain factors.

EXAMPLE II

Twenty grams of glutamic acid hydrochloride were mixed with 200 grams of karaya gum which had an average particle size of about 100 mesh, ASTM. The mixture was wetted with 50 cc. of 95% by volume of ethanol, granulated and dried for two hours at 105° F. 58 grams of granules containing 0.53 gram of hydrochloride were placed in 50 cc. of distilled water and the time-pH relationship determined. These results are given in Table III below.

*Table III*

| Time (min.) | 0 | 0.5 | 1 | 3 | 6 | 10 | 15 | 30 |
|---|---|---|---|---|---|---|---|---|
| pH | 3.4 | 3.1 | 3.0 | 3.0 | 3.0 | 3.0 | 2.9 | 2.9 |

EXAMPLE III 192 grams of betaine hydrochloride were mixed with 48 grams of 100 mesh size karaya gum. The mixture was moistened with 40 cc. of 95% by volume of ethanol, granulated and then dried at 105° F. for two hours. The granules were formed into tablets weighing 0.58 grams by the addition of 12 grams of magnesium stearate. The tablets contained 0.44 gram of betaine hydrochloride.

One tablet was placed in 50 cc. of distilled water (pH 4.5) and the time-pH relationship was determined. The results are reported in Table IV below.

*Table IV*

| Time (min.) | 0 | 0.5 | 1 | 3 | 6 | 10 | 15 | 30 |
|---|---|---|---|---|---|---|---|---|
| pH | 3.4 | 3.0 | 2.8 | 2.6 | 2.4 | 2.2 | 2.1 | 1.9 |

EXAMPLE IV

Ten grams of betaine hydrochloride were mixed with 100 grams of 100 mesh size karaya gum. The mixture was moistened with 25 cc. of 95% by volume ethanol, granulated and dried for two hours at 105° F. 4.84 grams of granules containing 0.44 gram of hydrochloride were placed in 50 cc. of distilled water (pH 4.5) and the time-pH relationship was determined as shown in Table V below.

*Table V*

| Time (min.) | 0 | 0.5 | 1 | 3 | 6 | 10 | 15 | 30 |
|---|---|---|---|---|---|---|---|---|
| pH | 3.4 | 3.0 | 2.9 | 2.9 | 2.9 | 2.9 | 2.9 | 2.9 |

The above data illustrates the effectiveness of karaya gum in controlling the release of hydrogen chloride in an aqueous medium. Such tests illustrate what can be expected from ingesting the composition of this invention to combat achlorhydria.

To demonstrate the long time of release of hydrochloride acid from my composition, the following experiment was made:

Since achlorhydria is accompanied by a lack of pepsin in the stomach, the composition was made with pepsin in it to simulate actual use.

The compound contained the following ingredients:

| | Milligrams |
|---|---|
| Glutamic acid hydrochloride | 500 |
| Pepsin | 35 |
| Karaya gum | 115 |

The tablet was tested by putting it into 100 cc. of water at 37° C. The solution was titrated with tenth normal sodium hydroxide solution using methyl red as the indicator. Readings were taken for five minutes and the results based on the quantity of sodium hydroxide employed are given below:

| Minutes: | Cc. | Minutes: | Cc. |
|---|---|---|---|
| 5 | 0.2 | 45 | 24.85 |
| 10 | 0.85 | 50 | 29.35 |
| 15 | 1.62 | 55 | 34.90 |
| 20 | 3.00 | 60 | 40.35 |
| 25 | 4.40 | 65 | 45.60 |
| 30 | 8.25 | 70 | 50.00 |
| 35 | 13.82 | 75 | 52.00 |
| 40 | 19.70 | | |

It is evident from the above test that karaya gum is ideally suited for the purpose of prolonging the release of hydrochloric acid from organic hydrochlorides as a means of combatting achlorhydria. The results shown above are unexpectedly superior over any other known agent which is used for the present purpose.

Having thus provided a written description of the invention along with specific examples thereof, it should be understood that no undue limitations or restrictions are to be imposed by reason thereof, but that the present invention is defined by the appended claims.

I claim:

1. A composition comprising an edible organic hydrochloride capable of releasing hydrogen chloride when taken internally in intimate association with karaya gum.

2. The composition of claim 1 wherein the hydrochloride is an amino acid hydrochloride.

3. The composition of claim 1 wherein the hydrochloride is selected from the group consisting of glutamic acid hydrochloride, betaine hydrochloride and urea hydrochloride.

4. A composition comprising an edible organic hydrochloride capable of releasing hydrogen chloride when taken internally combined with finely divided karaya gum in a quantity sufficient to regulate the release of hydrogen chloride in the stomach.

5. The composition of claim 4 wherein about 0.1 part of organic hydrochloride per part of karaya gum are combined.

6. The composition comprising about 0.1 to 10 parts of an organic hydrochloride distributed substantially uniformly in intimate contact with 1 part of karaya gum.

7. A process which comprises combining finely divided karaya gum with an edible organic hydrochloride which is capable of releasing hydrogen chloride when taken internally, wetting the mixture with an aliphatic alcohol to produce a pasty mass, granulating the paste, and drying the resulting granules.

8. The process of claim 7 wherein the hydrochloride is selected from the group consisting of glutamic acid hydrochloride, betaine hydrochloride and urea hydrochloride.

9. The process which comprises combining finely divided karaya gum with an edible organic hydrochloride which is capable of releasing hydrogen chloride when taken internally, wetting the resultant mixture with a low molecular weight alcohol to form a pasty mass, granulating the pasty mass, and drying the resulting granules.

10. The process of claim 9 wherein the gum has a mesh size of 100, ASTM.

11. The process of claim 9 being further characterized by using 0.1 to 10 parts of organic hydrochloride per part of gum, about 0.1 to 2 parts of alcohol and the granules are dried at about 100 to 120° F. for about 2 to 4 hours.

12. An article of manufacture comprising a unit dosage form of an edible organic hydrochloride which is capable of releasing hydrogen chloride when taken internally in combination with karaya gum.

13. The method of combatting achlorhydria which comprises ingesting the composition of claim 1.

14. The method of combatting achlorhydria which comprises ingesting the composition of claim 6.

References Cited in the file of this patent

UNITED STATES PATENTS 2,798,837    Sahyun _____ July 9, 1957

OTHER REFERENCES

Osborne: Bull. of the Nat'l Formulary Committee, vol. 19, Nos. 1–2, January-February 1951, p. 4.

Husa: Pharm. Dispensing, 1947, Husa Bros., Iowa City, Iowa, pp. 91–94.

Hutchins: J.A.P.A. (Pract. Ed.) vol. 16, No. 4, April 1955, pp. 226–230.